(12) United States Patent
Tsutsumi et al.

(10) Patent No.: US 10,480,430 B2
(45) Date of Patent: Nov. 19, 2019

(54) EVAPORATED FUEL PROCESSING DEVICE

(71) Applicants: AISAN KOGYO KABUSHIKI KAISHA, Obu-shi (JP); Toyota Jidosha Kabushiki Kaisha, Toyota-shi (JP)

(72) Inventors: Hidetoshi Tsutsumi, Kakamigahara (JP); Tatsuhiko Akita, Okazaki (JP); Yuusaku Nishimura, Toyota (JP)

(73) Assignees: AISAN KOGYO KABUSHIKI KAISHA, Obu-Shi, Aichi (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 19 days.

(21) Appl. No.: 15/834,822

(22) Filed: Dec. 7, 2017

(65) Prior Publication Data

US 2018/0163646 A1    Jun. 14, 2018

(30) Foreign Application Priority Data

Dec. 9, 2016  (JP) ................................. 2016-239846

(51) Int. Cl.
*F02M 25/08*    (2006.01)
*F02D 41/24*    (2006.01)
(Continued)

(52) U.S. Cl.
CPC ..... *F02D 41/0032* (2013.01); *F02D 41/0045* (2013.01); *F02D 41/2422* (2013.01);
(Continued)

(58) Field of Classification Search
CPC ............. F02D 41/0032; F02D 41/2422; F02D 41/0045; F02D 41/004; F02D 2200/0406;
(Continued)

(56) References Cited

U.S. PATENT DOCUMENTS

| 2013/0284155 A1 | 10/2013 | Cunningham |
| 2014/0196694 A1 | 7/2014 | Euliss et al. |
| 2014/0257672 A1 | 9/2014 | Surnilla |

FOREIGN PATENT DOCUMENTS

JP    2016-098746 A    5/2016

OTHER PUBLICATIONS

European Search Report for EP17205822 dated Jan. 31, 2018 (7 pages).

*Primary Examiner* — Hai H Huynh
(74) *Attorney, Agent, or Firm* — Shumaker, Loop & Kendrick, LLP

(57) ABSTRACT

An intake pipe of an evaporated fuel processing device is provided with a throttle valve downstream of a supercharger, and an ejector in parallel to the supercharger. A purge passage is branched into first and second branch passages, which connect to the intake pipe at a position downstream of the throttle valve and to a suction port of the ejector, respectively. In the ejector, its intake port is connected to the intake pipe at a position between the supercharger and the throttle valve, and its exhaust port is connected to the intake pipe at a position upstream of the supercharger. A flow rate of purge gas in the second branch passage is obtained based on at least two of a first pressure downstream of the throttle valve, a second pressure between the supercharger and the throttle valve, and a third pressure upstream of the supercharger.

6 Claims, 6 Drawing Sheets

(51) Int. Cl.
  *F02D 41/00*   (2006.01)
  *F02M 35/10*   (2006.01)
(52) U.S. Cl.
  CPC ...... *F02M 25/089* (2013.01); *F02M 25/0836* (2013.01); *F02M 25/0854* (2013.01); *F02M 35/1038* (2013.01); *F02M 35/10157* (2013.01); *F02M 35/10222* (2013.01); *F02M 35/10229* (2013.01); *F02D 41/004* (2013.01); *F02D 2200/0406* (2013.01); *Y02T 10/144* (2013.01)
(58) Field of Classification Search
  CPC ............. F02M 25/0836; F02M 25/089; F02M 25/0854; F02M 35/1038; F02M 35/10229; F02M 35/10157; F02M 35/10222; Y02T 10/144
  USPC ..... 123/516, 518, 520, 559.1; 701/103, 104, 701/105; 73/114.39
  See application file for complete search history.

FIG. 5

| P1-P3 | kPa | -60 | -50 | -40 | -30 | -20 | -10 | 0 | 10 |
|---|---|---|---|---|---|---|---|---|---|
| Flow Rate | L/min. | A1 | A2 | A3 | A4 | A5 | A6 | A7 | A8 |

FIG. 6

L/min.

| P1−P3 (kPa) \ P2−P3 (kPa) | 0 | 5 | 10 | 15 | 20 | 30 | 40 | 50 |
|---|---|---|---|---|---|---|---|---|
| -10 | B1 | B2 | B3 | B4 | B5 | B6 | B7 | B8 |
| -5 | B11 | B12 | B13 | B14 | B15 | B16 | B17 | B18 |
| 0 | B21 | B22 | B23 | B24 | B25 | B26 | B27 | B28 |
| 5 | B31 | B32 | B33 | B34 | B35 | B36 | B37 | B38 |
| 10 | B41 | B42 | B43 | B44 | B45 | B46 | B47 | B48 |

FIG. 7

L/min.

| P1 (kPa) \ P2 (kPa) | 70 | 80 | 90 | 100 | 110 | 120 | 130 | 140 |
|---|---|---|---|---|---|---|---|---|
| 70 | C1 | C2 | C3 | C4 | C5 | C6 | C7 | C8 |
| 80 | C11 | C12 | C13 | C14 | C15 | C16 | C17 | C18 |
| 90 | C21 | C22 | C23 | C24 | C25 | C26 | C27 | C28 |
| 100 | C31 | C32 | C33 | C34 | C35 | C36 | C37 | C38 |
| 110 | C41 | C42 | C43 | C44 | C45 | C46 | C47 | C48 |

FIG. 8

| P2-P3 | kPa | 0 | 5 | 10 | 15 | 20 | 30 | 40 | 50 |
|---|---|---|---|---|---|---|---|---|---|
| Flow Rate | L/min. | D1 | D2 | D3 | D4 | D5 | D6 | D7 | D8 |

FIG. 9

| P1-P3 | -20 | -15 | -10 | -5 | 0 | 5 | 10 | 15 |
|---|---|---|---|---|---|---|---|---|
| Correction Coefficient | 0.6 | 0.7 | 0.8 | 0.9 | 1.0 | 1.0 | 1.2 | 1.3 |

EVAPORATED FUEL PROCESSING DEVICE

TECHNICAL FIELD

The disclosure herein relates to an evaporated fuel processing device. Especially, it relates to an evaporated fuel processing device that is used in a vehicle and is provided with a supercharger.

DESCRIPTION OF RELATED ART

Japanese Patent Application Publication No. 2016-98746 describes an evaporated fuel processing device that is used in a vehicle and is provided with a supercharger. Hereinbelow, Japanese Patent Application Publication No. 2016-98746 will be termed Patent Literature 1. The evaporated fuel processing device of Patent Literature 1 branches a passage for supplying evaporated fuel to an intake pipe into a first passage and a second passage. The first passage supplies the evaporated fuel to downstream of the supercharger. The second passage supplies the evaporated fuel to upstream of the supercharger. In Patent Literature 1, the evaporated fuel is supplied to the intake pipe through the first passage when the downstream of the supercharger exhibits a negative pressure due to operation of an internal combustion engine. Further, when the supercharger is running and the downstream of the supercharger exhibits a positive pressure, the evaporated fuel is supplied to the intake pipe through the second passage. In Patent Literature 1, an ejector is connected to the intake pipe in parallel to the supercharger at positions of the intake pipe on upstream and downstream sides of the supercharger. A negative pressure generated by the ejector is used to supply the evaporated fuel to the intake pipe (to the upstream of the supercharger).

SUMMARY

Patent Literature 1 arranges a control valve for controlling a supply amount of the evaporated fuel on the first passage, but not on the second passage. Due to this, when the evaporated fuel is to be supplied to the intake pipe through the first passage (when the supercharger is not running), the supply amount of the evaporated fuel can be controlled. However, when the evaporated fuel is to be supplied to the intake pipe through the second passage (when the supercharger is running), the supply amount of the evaporated fuel cannot be controlled. Patent Literature 1 employs the above configuration because it stands on a premise that an air intake amount of the internal combustion engine is large during when the supercharger is running, and as such, no significant influence will be imposed on an air-fuel ratio of the internal combustion engine even if the supply amount of the evaporated fuel is not controlled.

However, there are cases in which a supply amount of evaporated fuel to be supplied to upstream of a supercharger through a second passage needs to be measured, and a supply amount of evaporated fuel to be supplied from an evaporated fuel processing device to an internal combustion engine needs to be controlled based thereon, such as when an air-fuel ratio of the internal combustion engine should be controlled strictly, or when an air supply amount by a supercharger is not so large (when downstream of the supercharger is close to an atmospheric pressure). The teachings herein disclose a technique for an evaporated fuel processing device configured to supply evaporated fuel to an intake pipe from upstream and downstream of a supercharger, by which a supply amount of the evaporated fuel to be supplied to an internal combustion engine can be controlled.

An evaporated fuel processing device disclosed herein may be configured to supply evaporated fuel evaporated in a fuel tank to an intake pipe, through which air is supplied to an internal combustion engine. An intake pipe may include supercharger and a throttle valve provided downstream of the supercharger. The evaporated fuel processing device may comprise: a canister configured to adsorb the fuel evaporated in the fuel tank; a purge passage that connects the canister and the intake pipe, and through which a purge gas sent from the canister to the internal combustion engine passes; a purge control valve provided on the purge passage; and an ejector provided on the intake pipe in parallel to the supercharger. The purge passage may branch into a first branch passage and a second branch passage at a position downstream of the purge control valve. The first branch passage may be connected to the intake pipe at a position downstream of the throttle valve, and the second branch passage may be connected to a suction port of the ejector. An intake port of the ejector may be connected to the intake pipe at a position between the supercharger and the throttle valve. An exhaust port of the ejector may be connected to the intake pipe at a position upstream of the supercharger. The evaporated fuel processing device may be configured to obtain a flow rate of the purge gas passing through the second branch passage based on at least two pressures among a first pressure in the intake pipe downstream of the throttle valve, a second pressure in the intake pipe between the supercharger and the throttle valve, and a third pressure in the intake pipe upstream of the supercharger.

In the above evaporated fuel processing device, the flow rate of the purge gas passing through the second branch passage can be obtained. Due to this, a purge gas amount to be supplied to the internal combustion engine (intake pipe) during when the supercharger is running can be obtained, and an air-fuel ratio of the internal combustion engine can more precisely be controlled. The evaporated fuel processing device as above may also be capable of obtaining a flow rate of the purge gas passing through the first branch passage based on the first pressure. Due to this, the purge gas amount to be supplied to the internal combustion engine can be obtained even when the supercharger is not running. Further, there are incidents where the purge gas is supplied to the intake pipe through both of the first and second branch passages, such as immediately after the supercharger started running, or when a pressure downstream of the supercharger is close to an atmospheric pressure although the supercharger is running. Since the evaporated fuel processing device as above can obtain the flow rates of both the first and second branch passages even in such cases, the flow rate of the purge gas to be supplied to the internal combustion engine can be controlled.

BRIEF DESCRIPTION OF DRAWINGS

FIG. 5 shows a table showing a relationship of an intake pipe internal pressure and a flow rate of gas flowing through a first branch passage;

FIG. 6 shows a table showing a relationship of the intake pipe internal pressure and a flow rate of gas flowing through a second branch passage;

FIG. 7 shows a table showing a relationship of the intake pipe internal pressure and the flow rate of gas flowing through the second branch passage;

FIG. 8 shows a table showing a relationship of the intake pipe internal pressure and the flow rate of gas flowing through the second branch passage; and FIG. 9 shows a table showing a relationship of the intake pipe internal pressure and a correction coefficient.

DETAILED DESCRIPTION

Figure 1:
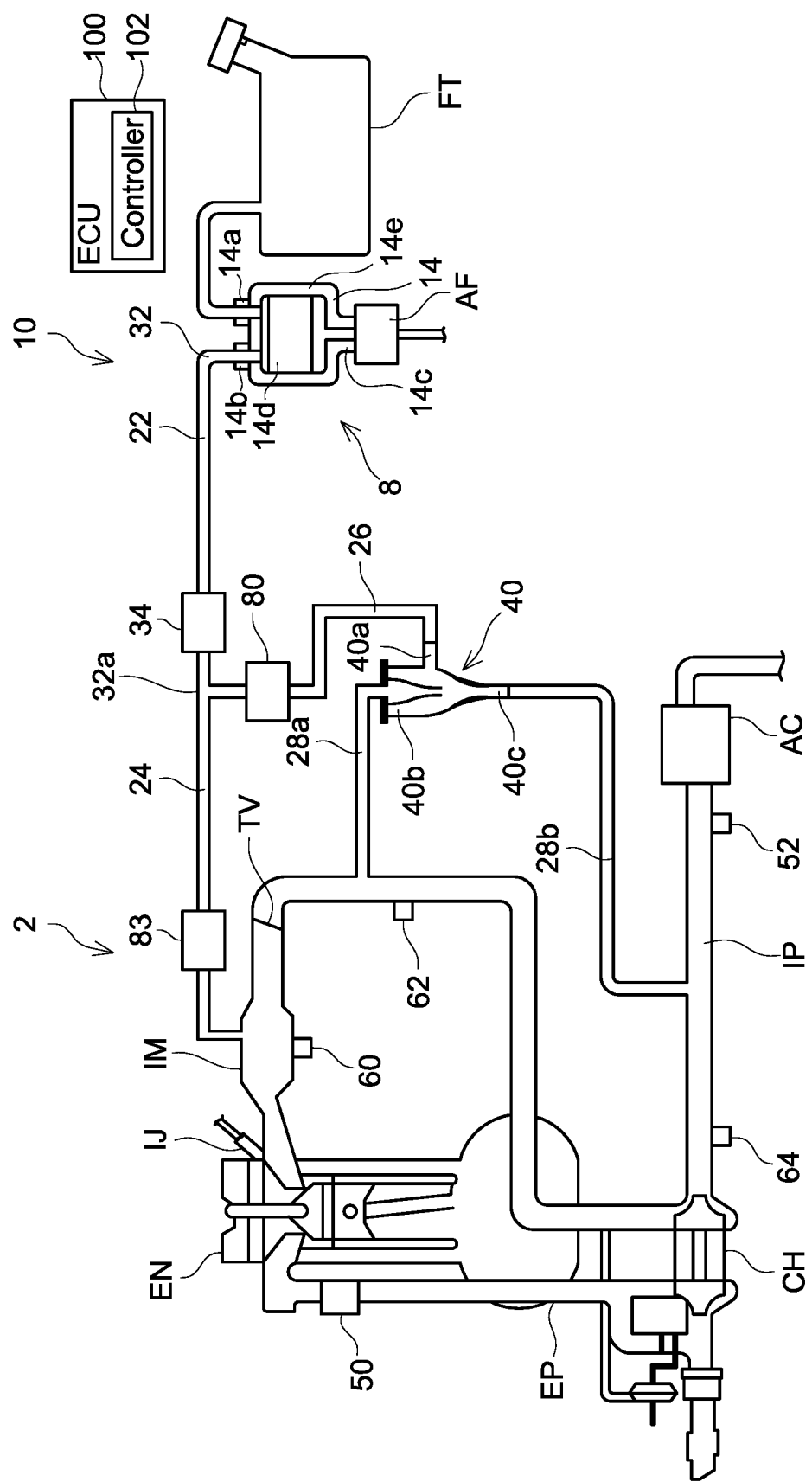
FIG. 1 shows an internal combustion engine system using an evaporated fuel processing device of a first embodiment.

Some of primary features of an evaporated fuel processing device disclosed herein will be listed below. The technical elements described hereinbelow are respectively independent technical elements, which exhibit technical usefulness solely as well as in various combinations.

An evaporated fuel processing device disclosed herein may configure a part of an internal combustion engine system, and may supply evaporated fuel that is evaporated in a fuel tank to an internal combustion engine. The evaporated fuel processing device may supply the evaporated fuel to an intake pipe through which air to be supplied to the internal combustion engine passes. The evaporated fuel processing device disclosed herein may supply the evaporated fuel to the intake pipe provided with a supercharger and a throttle valve downstream of the supercharger. The evaporated fuel processing device may be provided with a passage for supplying the evaporated fuel to upstream of the supercharger, and a passage for supplying the same to downstream of the supercharger.

The evaporated fuel processing device may be provided with a canister, a purge passage, a purge control valve, and an ejector. The canister may adsorb fuel evaporated in the fuel tank. The canister may be provided with active charcoal as its adsorbing material. The canister may be provided with a tank port, a purge port, and an atmosphere port. The tank port may communicate with the fuel tank, the purge port may communicate with the purge passage, and the atmosphere port may communicate with atmosphere.

The purge passage may connect the canister (purge port) and the intake pipe. Purge gas sent from the canister to the internal combustion engine may pass through the purge passage. The purge control valve may be provided on the purge passage. A supply amount of the purge gas may be adjusted by controlling an aperture of the purge control valve (duty ratio thereof). The purge passage may branch into a first branch passage and a second branch passage at a position downstream of the purge control valve.

The first branch passage may be connected to the intake pipe at a position downstream of the supercharger, more specifically at a position downstream of the throttle valve. The purge gas may be supplied to the intake pipe primarily through the first branch passage when the downstream of the throttle valve exhibits a negative pressure, that is, when the supercharger is stopped. The second branch passage may be connected to a suction port of the ejector. The purge gas passing through the second branch passage may be supplied to the intake pipe through the ejector. The purge gas may be supplied to the intake pipe primarily through the second branch passage when the downstream of the throttle valve exhibits a positive pressure, that is, when the supercharger is running. Further, the purge gas may be supplied to the intake pipe through both the first branch passage and the second branch passage when the downstream of the throttle valve exhibits a pressure near an atmospheric pressure.

The ejector may be attached to the intake pipe in parallel to the supercharger. An intake port of the ejector may be connected to the intake pipe at a position between the supercharger and the throttle valve. Further, an exhaust port of the ejector may be connected to the intake pipe at a position upstream of the supercharger. When the supercharger is running and the positive pressure is present between the supercharger and the throttle valve, gas may flow from the intake port to the exhaust port of the ejector, and a negative pressure may be generated at the suction port of the ejector so that the purge gas may be supplied from the exhaust port of the ejector to the intake pipe (upstream of the supercharger).

The internal combustion engine system may be provided with a pressure gauge configured to measure pressure(s) within the intake pipe and/or the purge passage. As the pressure gauge, three types may be provided, namely a first pressure gauge configured to measure a first pressure in the intake pipe downstream of the throttle valve, a second pressure gauge configured to measure a second pressure in the intake pipe between the supercharger and a throttle valve, and a third pressure gauge configured to measure a third pressure in the intake pipe upstream of the supercharger. The pressure in the intake pipe downstream of the throttle valve (first pressure) is equal to each of a pressure in the first branch passage and a pressure in the second branch passage. Due to this, the first pressure gauge may be provided at one of the intake pipe downstream of the throttle valve, the first branch passage, and the second branch passage. The pressure in the intake pipe between the supercharger and the throttle valve (second pressure) is equal to a pressure applied to the intake port of the ejector. Due to this, the second pressure gauge may be provided at either the intake pipe between the supercharger and the throttle valve or a passage connecting the intake pipe and the intake port of the ejector. The pressure in the intake pipe upstream of the supercharger (third pressure) is the atmospheric pressure. Due to this, the third pressure gauge may be provided on the intake pipe upstream of the supercharger, or outside the internal combustion engine system. It should be noted that each of the pressure gauges may be of a resistance wire type, a capacitance type, or a mechanical type.

The internal combustion engine system may be provided with an air cleaner. The air cleaner may be arranged at an upstream end of the intake pipe. The air cleaner may include an air filter, which can prevent foreign particles from entering into the intake pipe.

The internal combustion engine system may be provided with an air flowmeter (flow rate gauge). It can measure an amount of air (exterior air) introduced to the intake pipe (introduced to the internal combustion engine). The air flowmeter may be of a flap type, a hot wire type, or a Karman flow type. The air flowmeter may be integrated with the air cleaner, or may be separated from the air cleaner. In a case of being configured as a separate member, the air flowmeter may be provided on the intake pipe at a position upstream of a connection between the exhaust port of the ejector and the intake pipe. Further, the internal combustion engine system may be provided with a controller configured to control the supercharger, the throttle valve, and the purge control valve.

The evaporated fuel processing device may obtain the flow rate of the purge gas passing through the first branch passage and/or the second branch passage from values of the first pressure, the second pressure, and the third pressure. Specifically, the flow rate of the purge gas passing through the first branch passage may be obtained based on a table related to the flow rate of the purge gas with the first pressure as a variable. Alternatively, the flow rate of the purge gas passing through the first branch passage may be obtained based on a table related to the flow rate of the purge gas with a differential pressure between the first pressure and the third pressure as a variable.

The measurement of the purge gas flow rate does not necessarily need to be performed under an aperture of the purge control valve that was used when the table was created. For example, even if the table was made when the purge control valve was fully open (with the duty ratio of 100%) whereas the purge control valve is controlled with the duty ratio of 50% at the time of the measurement, the flow rate of the purge gas with respect to the first pressure (or the differential pressure between the first pressure and the third pressure) for the case of 100% duty ratio may be read from the table, and the purge gas flow rate can be obtained by multiplying the read flow rate by a coefficient according to a difference in the duty ratio. This applies similarly to a case of obtaining the flow rate of the purge gas passing through the second branch passage.

The flow rate of the purge gas passing through the second branch passage may be obtained based on a two-dimensional table related to the purge gas flow rate with the first pressure and the second pressure as variables. Alternatively, the flow rate of the purge gas passing through the second branch passage may be obtained based on a two-dimensional table related to the purge gas flow rate with the differential pressure between the first and third pressures and the differential pressure between the second and third pressures as variables. Alternatively, the flow rate of the purge gas passing through the second branch passage may be obtained by multiplying the flow rate, which is obtained based on the table related to the flow rate of the purge gas with the differential pressure between the second and third pressures as the variable, by a correction coefficient, which is obtained based on a table related to the correction coefficient with the differential pressure between the first and third pressures as a variable. The flow rate of the purge gas passing through the first branch passage and the flow rate of the purge gas passing through the second branch passage may be added to obtain a total amount of the purge gas to be supplied to the intake pipe (internal combustion engine).

Embodiments (First Embodiment)

An internal combustion engine system 10 provided with an evaporated fuel processing device 8 will be described with reference to FIG. 1. The internal combustion engine system 10 is installed in a vehicle such as an automobile. The evaporated fuel processing device 8 is connected to a fuel supply system 2 that supplies fuel stored in a fuel tank FT to an engine EN.

The fuel supply system 2 supplies fuel, which is supplied under pressure by a fuel pump (not shown) installed in the fuel tank FT, to an injector IJ. The injector IJ includes a solenoid of which aperture is adjusted by an ECU (abbreviation of Engine Control Unit) 100 to be described later. The injector IJ sprays the fuel to the engine EN.

The engine EN has an intake pipe IP and an exhaust pipe EP connected thereto. The intake pipe IP is a pipe for supplying air to the engine EN by a negative pressure of the engine EN or an operation of a supercharger CH. The intake pipe IP has a throttle valve TV arranged thereon. The throttle valve TV is arranged at a position downstream of the supercharger CH but upstream of an intake manifold IM. An amount of air to be flown into the engine EN can be controlled by adjusting an aperture of the throttle valve TV. That is, the throttle valve TV controls an air intake amount of the engine EN. The throttle valve TV is controlled by the ECU 100.

The supercharger CH is arranged on the intake pipe IP at a position upstream of the throttle valve TV. The supercharger CH is a so-called turbo charger, which rotates a turbine by gas discharged by the exhaust pipe EP to pressurize air in the intake pipe IP and supplies the air to the engine EN. The supercharger CH is controlled by the ECU 100 so that it starts running when a revolution speed N of the engine EN exceeds a preset revolution speed (such as 2000 rpm).

An air cleaner AC is arranged on the intake pipe IP at a position upstream of the supercharger CH. The air cleaner AC includes a filter for removing foreign particles from air flowing into the intake pipe IP. In the intake pipe IP, when the throttle valve TV opens, air is sucked in toward the engine EN through the air cleaner AC. The engine EN combusts the fuel and the air inside thereof, and discharges post-combustion gas to the exhaust pipe EP.

The ECU 100 is connected to an air-fuel ratio sensor 50 arranged in the exhaust pipe EP. The ECU 100 obtains an air-fuel ratio in the exhaust pipe EP from a detection result of the air-fuel ratio sensor 50, and controls a fuel injection amount from the injector IJ based thereon.

Further, the ECU 100 is connected to an air flowmeter 52 arranged in a vicinity of the air cleaner AC. The air flowmeter 52 is a so-called hot-wire type air flowmeter, however, it may be of another configuration. The ECU 100 receives a signal indicating a detection result from the air flowmeter 52, and obtains an air amount supplied to the intake pipe IP.

In a state where the supercharger CH is stopped, a negative pressure is generated in the intake pipe IP (intake manifold IM) by the running engine EN. On the other hand, in a state where the supercharger CH is running, a portion on the downstream of the supercharger CH exhibits a positive pressure, and a portion on the upstream of the supercharger CH exhibits an atmospheric pressure.

The evaporated fuel processing device 8 supplies evaporated fuel (purge gas) in the fuel tank FT to the engine EN through the intake pipe IP. The evaporated fuel processing device 8 includes a canister 14, a gas pipe 32, a purge control valve 34, and an ejector 40. The canister 14 adsorbs the evaporated fuel generated in the fuel tank FT. The canister 14 includes active charcoal 14*d*, and a casing 14*e* housing the active charcoal 14*d*. The casing 14*e* includes a tank port 14*a*, a purge port 14*b*, and an atmosphere port 14*c*. The tank port 14*a* is connected to an upper end of the fuel tank FT. Due to this, the evaporated fuel in the fuel tank FT flows into the canister 14. The active charcoal 14*d* adsorbs the evaporated fuel from the gas flowing into the casing 14*e* from the fuel tank FT. Due to this, the evaporated fuel can be prevented from being discharged to open air.

The atmosphere port 14*c* communicates with open air through the air filter AF. The air filter AF removes foreign particles from the air flowing into the canister 14 through the atmosphere port 14*c*.

The purge port 14*b* communicates with the gas pipe 32. The gas pipe 32 is an example of a purge passage. The gas pipe 32 includes a first passage 24, a second passage 26, and a third passage 22. The first passage 24 is an example of a first branch passage, and the second passage 26 is an example of a second branch passage. The first passage 24 connects the purge control valve 34 and the intake pipe IP downstream of the throttle valve TV. The second passage 26 connects the purge control valve 34 and the intake pipe IP upstream of the supercharger CH. The third passage 22 connects the canister 14 and the purge control valve 34. The gas pipe 32 may be described as being branched into the first passage 24 and the second passage 26 at a branching point 32a downstream of the purge control valve 34. The passages 22, 24, and 26 are constituted of a flexible material such as rubber or resin. Further, the passages 22, 24, and 26 may be constituted of a metal material such as iron.

The purge gas inside the canister 14 flows into the third passage 22 from the canister 14 through the purge port 14b. The purge gas inside the third passage 22 passes through the purge control valve 34, flows through the first passage 24 and/or the second passage 26, and is supplied to the intake pipe IP.

The first passage 24 is detachably coupled to the intake manifold IM. A check valve 83 is provided at an intermediate position of the first passage 24. The check valve 83 allows gas to flow in the first passage 24 toward the intake manifold IM, and prohibits it from flowing toward the canister 14. The second passage 26 is detachably coupled to a suction port 40a of the ejector 40. A check valve 80 is provided at an intermediate position of the second passage 26. The check valve 80 allows gas to flow in the second passage 26 toward the intake pipe IP, and prohibits it from flowing toward the canister 14.

The purge control valve 34 is connected to the third passage 22. That is, the purge control valve 34 is arranged on the gas pipe 32 at a position upstream of the branching point 32a. When the purge control valve 34 is in a closed state, the purge gas is stopped by the purge control valve 34, and thus does not flow to the first passage 24 and the second passage 26. On the other hand, when the purge control valve 34 is opened, the purge gas passes through the first passage 24 and/or the second passage 26 and enters into the intake pipe IP. The purge control valve 34 is an electronic control valve, and is controlled by the ECU 100.

The ECU 100 includes a controller 102 configured to control the internal combustion engine system 10. The controller 102 is arranged integrally with other parts of the ECU 100 (for example, a portion that controls the engine EN). The controller 102 may be arranged separately from the other parts of the ECU 100. The controller 102 includes a CPU, and a memory such as a ROM and a RAM. The controller 102 controls the internal combustion engine system 10 according to a program that is stored in advance in the memory. Further, the controller 102 outputs signals to the throttle valve TV and the purge control valve 34 to execute duty ratio control. The controller 102 adjusts duty ratios of the signals to be outputted to the respective valves TV, 34 to adjust an opened time period of the respective valves TV, 34.

The ejector 40 includes an intake port 40b, an exhaust port 40c, and the suction port 40a. The intake port 40b is connected with a suction passage 28a. The suction passage 28a connects the intake port 40b and the intake pipe IP downstream of the supercharger CH (between the supercharger CH and the throttle valve TV). The exhaust port 40c is connected with an exhaust passage 28b. The exhaust passage 28b connects the exhaust port 40c and the intake pipe IP upstream of the supercharger CH. The suction port 40a is connected with the second passage 26.

Three pressure gauges 60, 62, 64 are attached to the intake pipe IP. The first pressure gauge 60 is attached at a position downstream of the throttle valve TV, which more specifically is at the intake manifold IM. The second pressure gauge 62 is attached at a position downstream of the supercharger CH but upstream of the throttle valve TV. The third pressure gauge 64 is attached at a position upstream of the supercharger CH.

When the supercharger CH is not running, the intake manifold IM exhibits a negative pressure by the control of the throttle valve TV. Due to this, when the controller 102 opens the purge control valve 34, the purge gas passes through the third passage 22 and the first passage 24 from the canister 14, and is supplied to the intake manifold IM which is at a position downstream of the supercharger CH. When the supercharger CH is not running, the pressure downstream of the supercharger CH is equal to or lower than the pressure upstream of the supercharger CH. Due to this, gas does not flow in the ejector 40 from the intake port 40b toward the exhaust port 40c. Since no negative pressure is generated in the suction port 40a, the purge gas does not pass through the second passage 26, and thus is not supplied to the upstream of the supercharger CH.

When the supercharger CH starts to run, the intake pipe IP downstream of the supercharger CH exhibits a positive pressure. A pressure difference is generated between the intake port 40b and the exhaust port 40c of the ejector 40, and gas flows from the intake port 40b towards the exhaust port 40c. As a result, a negative pressure is generated in the suction port 40a, and the purge gas is supplied to the intake pipe IP upstream of the supercharger CH by passing through the third passage 22, the second passage 26, the ejector 40, and the exhaust passage 28b from the canister 14. Since the intake pipe IP downstream of the supercharger CH exhibits the positive pressure, the purge gas does not pass through the first passage 24.

During a shifting period during which the supercharger CH shifts from a stop state to a running state (or from the running state to the stop state), or when the supercharger CH is running but the downstream of the supercharger CH exhibits a pressure close to the atmospheric pressure, the purge gas passes through both the first passage 24 and the second passage 26, and may be supplied to both the upstream and the downstream of the supercharger CH.

In the internal combustion engine system 10, values of the pressure gauges 60, 62, 64 can be used to obtain the flow rate of the purge gas supplied to the intake pipe IP through the first passage 24 and the flow rate of the purge gas supplied to the intake pipe IP through the second passage 26. The first pressure gauge 60 is configured to detect the pressure in the intake pipe IP downstream of the throttle valve TV, that is, in the intake manifold IM. The second pressure gauge 62 is configured to detect the pressure in the intake pipe IP between the supercharger CH and the throttle valve TV. The third pressure gauge 64 is configured to detect the pressure in the intake pipe IP upstream of the supercharger CH.

Figure 2:
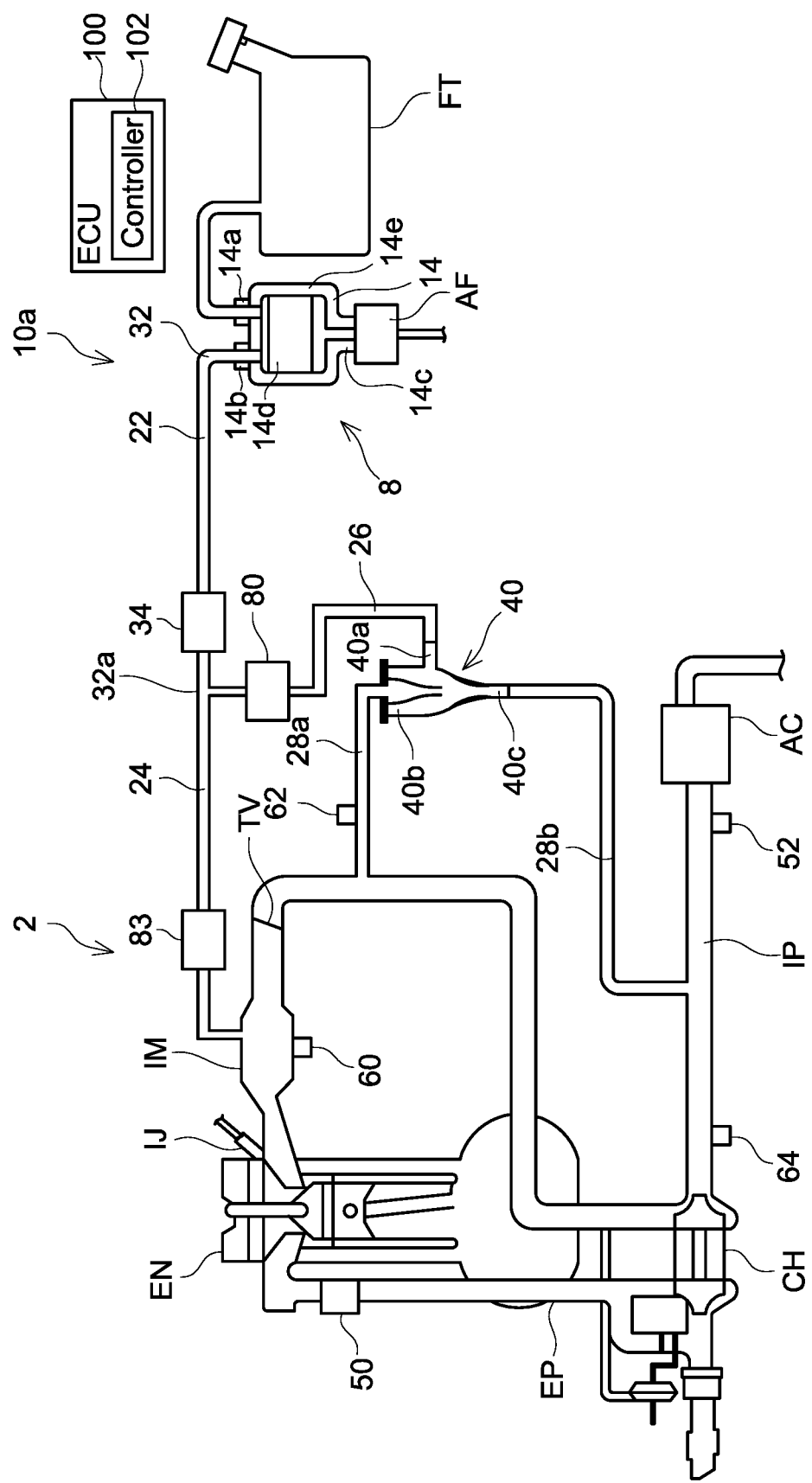
FIG. 2 shows a variant of the internal combustion engine system of the first embodiment.
Figure 3:
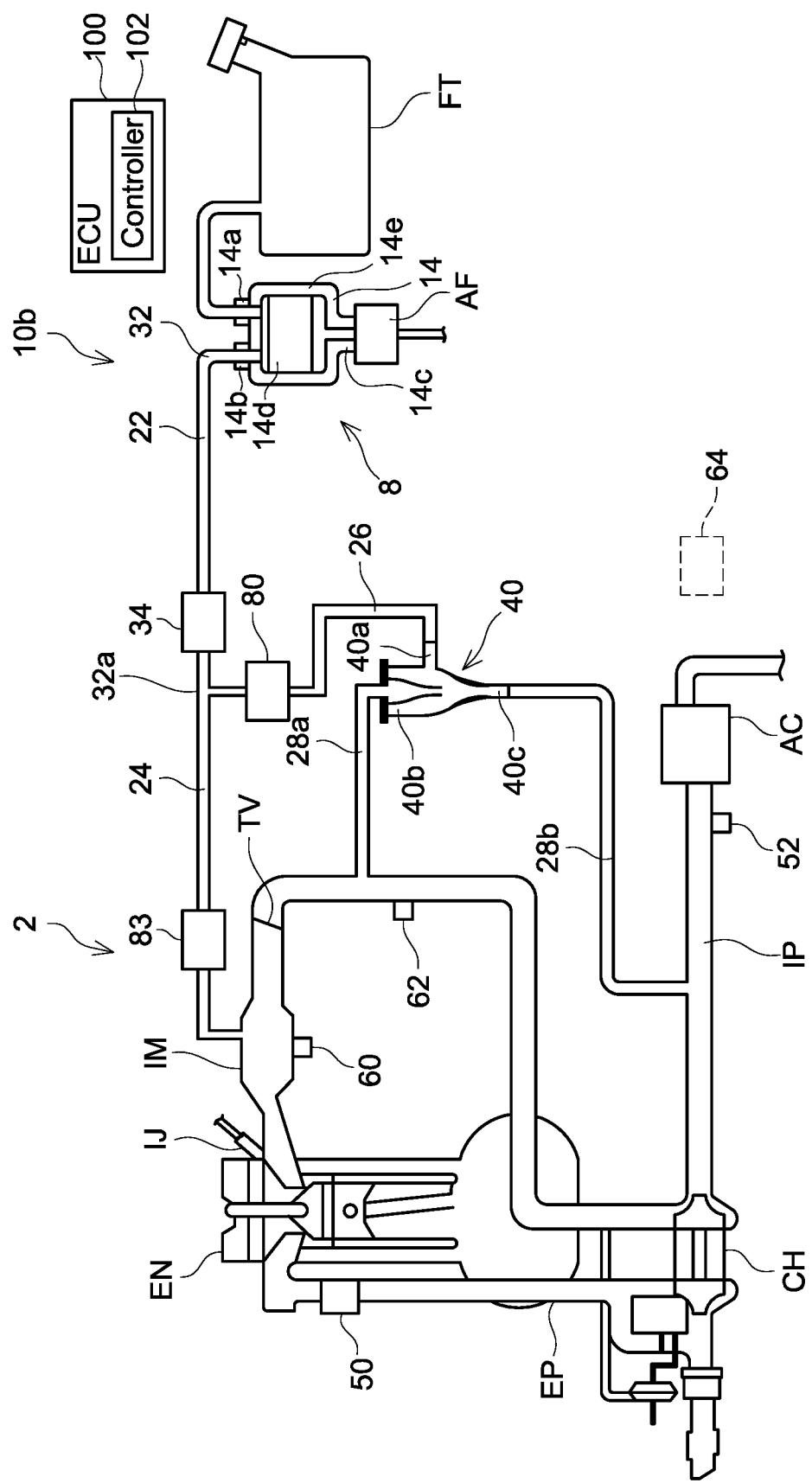
FIG. 3 shows a variant of the internal combustion engine system of the first embodiment.

As shown in FIG. 1, the intake pipe IP between the supercharger CH and the throttle valve TV communicates with the intake passage 28a. Due to this, the pressure in the intake pipe IP between the supercharger CH and the throttle valve TV is equal to the pressure in the intake passage 28a. Further, the pressure in the intake pipe IP upstream of the supercharger CH is the atmospheric pressure. Due to this, the pressure gauge 62 may be provided on the intake passage 28a as in an internal combustion engine system 10a of FIG. 2, and the pressure gauge 64 may be provided outside of an internal combustion engine system 10b as in the internal combustion engine system 10b of FIG. 3. The pressure gauges 62, 64 are not limited to the configuration of the internal combustion engine system 10 shown in FIG. 1, so long as they are at positions where desired pressures can be detected. Although not shown, the pressure gauge 62 may be arranged on the intake passage 28a, and further, the pressure gauge 64 may be arranged outside the internal combustion engine system 10b.

(Second Embodiment)

Figure 4:
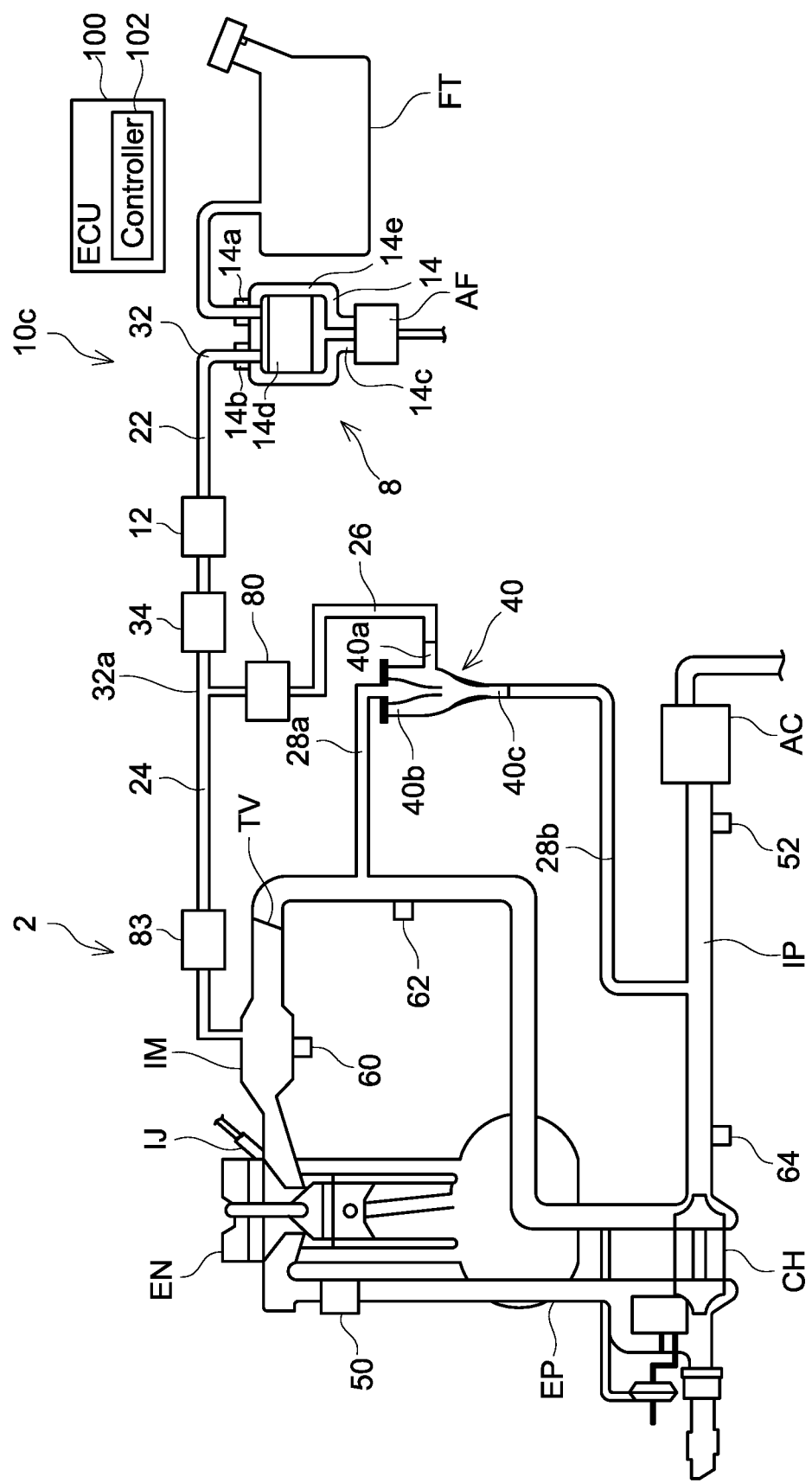
FIG. 4 shows an internal combustion engine system using an evaporated fuel processing device of a second embodiment.

An internal combustion engine system 10c will be described with reference to FIG. 4. The internal combustion engine system 10c is a variant of the internal combustion engine system 10, and the descriptions thereof may be omitted for configurations in the internal combustion engine system 10c that are identical to those of the internal combustion engine system 10 by giving same reference signs.

In the internal combustion engine system 10c, a pump 12 is arranged upstream of the purge control valve 34. The pump 12 is a so-called vortex pump (which may also be referred to as a cascade pump, or a Wesco pump). The pump 12 is controlled by the ECU 100. A suction port of the pump 12 communicate with the canister 14, and a discharge port communicates with the purge control valve 34. The purge gas can be pressurized and sent to the passages 24, 26 by using the pump 12. Even if the negative pressure in the intake manifold IM or the suction port 40a is insufficient, the purge gas can be supplied to the intake pipe IP.

As aforementioned, the flow rate of the purge gas supplied to the intake pipe IP can be obtained by using the values of the pressure gauges 60, 62, 64. Hereinbelow, a method of obtaining the flow rate of the purge gas supplied to the intake pipe IP will be described.

Firstly, a method of obtaining the flow rate of the purge gas supplied to the intake pipe IP through the first passage 24 will be described with reference to FIG. 5. FIG. 5 is a table showing a difference (P1−P3) between the first pressure P1 and the third pressure P3, and the flow rate of the purge gas passing through the first passage 24 when the purge control valve 34 is fully open (with the duty ratio of 100%). This table is stored in the ECU 100.

In the internal combustion engine systems 10 to 10c, when the purge control valve 34 is driven and the supply of the purge gas is started, the duty ratio of the purge control valve 34, the value of the first pressure gauge 60 (first pressure P1), the value of the second pressure gauge 62 (second pressure P2), and the value of the third pressure gauge 64 (third pressure P3) are inputted to the ECU 100. "P1−P3" is calculated from the first pressure P1 and the third pressure P3, and the gas flow rate for the case of 100% duty ratio is read from the table of FIG. 5. The duty ratio of the purge control valve 34 is multiplied by the gas flow rate that has been read, and the flow rate of the purge gas passing through the first passage 24 is thereby calculated. For example, when "P1−P3=−40" and the duty ratio is 60%, "gas flow rate=A3×0.6" is obtained.

If the first pressure gauge 60 is of a type that detects a gauge pressure, the flow rate of the purge gas passing through the first passage 24 can be calculated based on the first pressure P1 and a table indicating the flow rate of the purge gas passing through the first passage 24. Further, as aforementioned, the third pressure P3 is the atmospheric pressure. Due to this, even if the first pressure gauge 60 is not of the type that detects the gauge pressure, the flow rate of the purge gas passing through the first passage 24 may be calculated based on the first pressure P1 and the table indicating the flow rate of the purge gas passing through the first passage 24 without giving consideration to an impact of the atmospheric pressure.

Further, the flow rate of the purge gas passing through the first passage 24 may be calculated based on a table indicating "P1" or "P1−P3" and the flow rate of the purge gas passing through the first passage 24 when the purge control valve 34 is opened at a particular aperture (for example, with 50% duty ratio). For example, when FIG. 5 is read for a case of 50% duty ratio, "gas flow rate=A3×1.2" is obtained when "P1−P3=−40" and the duty ratio of the purge control valve 34 is 60%. The gas flow rate can be calculated based on a table created for the particular aperture that frequently takes place, and measurement accuracy of the gas flow rate can be improved.

Alternatively, tables indicating "P1" or "P1−P3" and the flow rate of the purge gas passing through the first passage 24 for plural particular apertures (such as 20%, 30%, 40%, 50%, 60%, and 70% duty ratios) may be prepared, and the flow rate of the purge gas passing through the first passage 24 may be calculated based on the table corresponding to the aperture of the purge control valve 34. The gas flow rate in the table can be used without calculation (with no need to correct the duty ratio), and the measurement accuracy of the gas flow rate can further be improved.

Next, with reference to FIG. 6, a method of obtaining the flow rate of the purge gas supplied to the intake pipe IP through the second passage 26 will be described. FIG. 6 is a two-dimensional table of the flow rate of the purge gas passing through the second passage 26 with the "difference between the first pressure P1 and the third pressure P3" and "the difference between the second pressure P2 and the third pressure P3" as variables when the purge control valve 34 is fully open (with the duty ratio of 100%). This table is stored in the ECU 100.

As aforementioned, when the supply of the purge gas is started, the duty ratio of the purge control valve 34, the first pressure P1, the second pressure P2, and the third pressure P3 are inputted to the ECU 100. "P1−P3" is calculated from the first pressure P1 and the third pressure P3, "P2−P3" is calculated from the second pressure P2 and the third pressure P3, and the gas flow rate for the case of 100% duty ratio is read from the table of FIG. 6. The duty ratio of the purge control valve 34 is multiplied by the gas flow rate that has been read, and the flow rate of the purge gas passing through the second passage 26 is thereby calculated.

Similarly to the flow rate of the purge gas passing through the first passage 24, the flow rate of the purge gas may be calculated by using the first pressure P1 and the first passage 24 without giving consideration to the impact of the atmospheric pressure. In this case, as shown in FIG. 7, a two-dimensional table of the flow rate of the purge gas passing through the second passage 26 using the first pressure P1 and the second pressure P2 as variables may be used to obtain the flow rate of the purge gas passing through the second passage 26.

Next, another method of obtaining the flow rate of the purge gas supplied to the intake pipe IP through the second passage 26 will be described with reference to FIGS. 8 and 9. FIG. 8 is a table indicating the difference (P2−P3) between the second pressure P2 and the third pressure P3 and the flow rate of the purge gas passing through the second passage 26 when the purge control valve 34 is fully open (with the duty ratio of 100%). That is, this is a table indicating the differential pressure from the intake port 40b to the exhaust port 40c of the ejector 40 and the flow rate of the purge gas passing through the second passage 26. Further, FIG. 9 is a correction coefficient that gives consideration to the pressure of the suction port 40a of the ejector 40, and is specifically a table indicating the difference (P1–P3) between the first pressure P1 and the third pressure P3, and the correction coefficient. These tables are stored in the ECU 100.

In the ejector 40, when gas flows from the intake port 40b toward the exhaust port 40c, a negative pressure is generated at the suction port 40a. Normally, the negative pressure generated at the suction port 40a has a correlated relationship with the differential pressure between the intake port 40b and the exhaust port 40c. Due to this, from the table of FIG. 8, the flow rate of the purge gas passing through the second passage 26 can be obtained. However, in cases of the internal combustion engine systems 10 to 10c, the suction port 40a communicates with the intake manifold IM, of which pressure fluctuates. Due to this, the purge gas flow rate needs to be corrected according to the pressure (first pressure P1) of the intake manifold IM.

In this method, when the supply of the purge gas is started, "P2–P3" is calculated from the second pressure P2 and the third pressure P3, and the gas flow rate for the case of 100% duty ratio is read from the table of FIG. 8. Moreover, "P1–P3" is calculated from the first pressure P1 and the third pressure P3, and the correction coefficient is read from the table of FIG. 9. Thereafter, the correction coefficient is multiplied to the gas flow rate, and the duty ratio of the purge control valve 34 is further multiplied thereto, as a result of which the flow rate of the purge gas passing through the second passage 26 is calculated. As it is apparent from FIG. 9, larger values are set as the correction coefficient for higher first pressures P1 (higher pressures in the intake manifold IM).

The methods for obtaining the flow rate of the purge gas passing through the second passage 26 have been described as above, however, if the second pressure gauge 62 and the third pressure gauge 64 are of the type that detects the gauge pressure, the flow rate of the purge gas passing through the second passage 26 can be calculated based on a table that substitutes "P2–P3" and "P1–P3" in FIG. 6 to "P2" and "P1", respectively. Similarly, the flow rate of the purge gas passing through the second passage 26 can be calculated based on tables that substitute "P2–P3" in FIG. 8 to "P2", and "P1–P3" in FIG. 9 to "P1".

Further, similarly to the flow rate measurement of the purge gas passing through the first passage 24, in the flow rate measurement of the purge gas passing through the second passage 26 as well, the gas flow rate may be calculated based on the table for the purge control valve 34 with a particular aperture. Alternatively, the flow rate of the purge gas passing through the second passage 26 may be obtained by preparing the tables for the plural particular apertures (such as 20%, 30%, 40%, 50%, 60%, and 70% duty ratios) and using the table corresponding to the aperture of the purge control valve 34.

According to the above methods, both the flow rate of the purge gas passing through the first passage 24 and the flow rate of the purge gas passing through the second passage 26 can be obtained. By adding these two, a total amount of the purge gas supplied to the intake pipe IP can be obtained. In the above methods, the total amount of the purge gas supplied to the intake pipe IP can be obtained in any of the cases of the purge gas "passing through only the first passage 24", "passing through only the second passage 26", and "passing through both the first passage 24 and the second passage 26", and the flow rate of the purge gas supplied to the engine EN can be controlled based on the results thereof.

Specific examples of the present invention are described above in detail, but these examples are merely illustrative and place no limitation on the scope of the patent claims.

The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples shown by the present specification or drawings is to satisfy multiple objectives simultaneously, and satisfying any one of those objectives gives technical utility to the present invention.

What is claimed is:

1. An evaporated fuel processing device configured to supply evaporated fuel evaporated in a fuel tank to an intake pipe, through which air is supplied to an internal combustion engine, the intake pipe including a supercharger and a throttle valve provided at a position downstream of the supercharger, the evaporated fuel processing device comprising:

a canister configured to adsorb the fuel evaporated in the fuel tank;

a purge passage that connects the canister and the intake pipe, and through which a purge gas sent from the canister to the internal combustion engine passes;

a purge control valve provided on the purge passage; and an ejector provided on the intake pipe in parallel to the supercharger, wherein the purge passage branches into a first branch passage and a second branch passage at a position downstream of the purge control valve, the first branch passage is connected to the intake pipe at a position downstream of the throttle valve, the second branch passage is connected to a suction port of the ejector, an intake port of the ejector is connected to the intake pipe at a position between the supercharger and the throttle valve, an exhaust port of the ejector is connected to the intake pipe at a position upstream of the supercharger, the evaporated fuel processing device is configured to obtain a flow rate of the purge gas passing through the second branch passage based on a first pressure in the intake pipe downstream of the throttle valve, a second pressure in the intake pipe between the supercharger and the throttle valve, and a third pressure in the intake pipe upstream of the supercharger, and the flow rate of the purge gas passing through the second branch passage is obtained by multiplying a flow rate and a correction coefficient, the flow rate being obtained based on a table related to the flow rate of the purge gas with the differential pressure between the second pressure and the third pressure as a variable, and the correction coefficient being obtained based on a table related to the correction coefficient of the purge gas with the differential pressure between the first pressure and the third pressure as a variable.

2. The evaporated fuel processing device according to claim 1, wherein a flow rate of the purge gas passing through the first branch passage is obtained based on a table relating to the flow rate of the purge gas with the first pressure or a differential pressure between the first pressure and the third pressure as a variable.

3. The evaporated fuel processing device according to claim 2, wherein a flow rate of the purge gas passing through the purge passage is obtained by adding the flow rate of the purge gas passing through the first branch passage and the flow rate of the purge gas passing through the second branch passage.

4. An evaporated fuel processing device configured to supply evaporated fuel evaporated in a fuel tank to an intake pipe, through which air is supplied to an internal combustion engine, the intake pipe including a supercharger and a throttle valve provided downstream of the supercharger, the evaporated fuel processing device comprising:

a canister configured to adsorb the fuel evaporated in the fuel tank;

a purge passage that connects the canister and the intake pipe, and through which a purge gas sent from the canister passes to the internal combustion engine passes;

a purge control valve provided on the purge passage;

an ejector provided on the intake pipe in parallel to the supercharger;

a first pressure gauge configured to measure a first pressure in the intake pipe downstream of the throttle valve;

a second pressure gauge configured to measure a second pressure in the intake pipe between the supercharger and the throttle valve; and a third pressure gauge configured to measure a third pressure in the intake pipe upstream of the supercharger, the purge passage branches into a first branch passage and a second branch passage at a position downstream of the purge control valve, the first branch passage is connected to the intake pipe at a position downstream of the throttle valve, the second branch passage is connected to a suction port of the ejector, an intake port of the ejector is connected to the intake pipe at a position between the supercharger and the throttle valve, an exhaust port of the ejector is connected to the intake pipe at a position upstream of the supercharger, wherein a flow rate of the purge gas passing through the second branch passage is obtained by multiplying a flow rate and a correction coefficient, the flow rate being obtained based on a table related to the flow rate of the purge gas with the differential pressure between the second pressure and the third pressure as a variable, and the correction coefficient being obtained based on a table related to the correction coefficient of the purge gas with the differential pressure between the first pressure and the third pressure as a variable.

5. The evaporated fuel processing device according to claim 4, wherein a flow rate of the purge gas passing through the first branch passage is obtained based on a table relating to the flow rate of the purge gas with the first pressure or a differential pressure between the first pressure and the third pressure as a variable.

6. The evaporated fuel processing device according to claim 5, wherein a flow rate of the purge gas passing through the purge passage is obtained by adding the flow rate of the purge gas passing through the first branch passage and the flow rate of the purge gas passing through the second branch passage.

* * * * *